United States Patent
Mitsch

(10) Patent No.: US 12,006,998 B2
(45) Date of Patent: Jun. 11, 2024

(54) ADAPTIVE TUNED MASS DAMPER FOR DAMPING LOW EXCITATION FREQUENCIES

(71) Applicant: FM ENERGIE GMBH & CO. KG, Heppenheim (DE)

(72) Inventor: Franz Mitsch, Heppenheim (DE)

(73) Assignee: FM Energie GmbH & Co. KG, Heppenheim (DE)

( * ) Notice: Subject to any disclaimer, the term of this patent is extended or adjusted under 35 U.S.C. 154(b) by 0 days.

(21) Appl. No.: 17/800,240

(22) PCT Filed: Feb. 15, 2021

(86) PCT No.: PCT/EP2021/025055
§ 371 (c)(1),
(2) Date: Aug. 17, 2022

(87) PCT Pub. No.: WO2021/164938
PCT Pub. Date: Aug. 26, 2021

(65) Prior Publication Data
US 2023/0062968 A1    Mar. 2, 2023

(30) Foreign Application Priority Data
Feb. 17, 2020 (EP) .................. 20000069
Nov. 16, 2020 (EP) .................. 20020532

(51) Int. Cl.
*F03D 80/80* (2016.01)
*F16F 7/10* (2006.01)
*F16F 7/112* (2006.01)

(52) U.S. Cl.
CPC ........ *F16F 7/1017* (2013.01); *F03D 80/88* (2016.05); *F16F 7/112* (2013.01);
(Continued)

(58) Field of Classification Search
CPC ........ F16F 7/1017; F16F 7/112; F16F 9/0245; F16F 9/0454; F16F 9/54; F16F 9/56;
(Continued)

(56) References Cited

U.S. PATENT DOCUMENTS 6,626,642 B1 * 9/2003 Veldkamp .......... F03D 80/00
  416/79
6,672,837 B1 * 1/2004 Veldkamp .......... F16F 7/10
  416/500

(Continued)

FOREIGN PATENT DOCUMENTS

CN   200949272 Y  *  9/2007
CN   112392893 A  *  2/2021 ............ F16F 7/1011
(Continued)

OTHER PUBLICATIONS

International Search Report Corresponding to PCT/EP2021/025055 dated Aug. 5, 2021.
(Continued)

*Primary Examiner* — David E Sosnowski
*Assistant Examiner* — Wayne A Lambert
(74) *Attorney, Agent, or Firm* — Finch & Maloney PLLC

(57) ABSTRACT

The invention relates to a new type of tuned mass damper which is suitable in particular for damping oscillations of a low frequency, and can thus be used preferably as a construction damper when building or siting high, narrow structures, such as wind-turbine towers. The invention relates in particular to a pendulum oscillation damper having a first pendulum, to which the mass is attached, and a second pendulum, which is formed by a spring-like support device of a different design and is operated using a gas-air volume such that, with the aid thereof, the frequency of the oscillation system can be adapted and adjusted.

21 Claims, 6 Drawing Sheets

(52) U.S. Cl.
CPC ..... *F05B 2260/964* (2013.01); *F16F 2222/08* (2013.01); *F16F 2228/04* (2013.01); *F16F 2228/066* (2013.01)

(58) Field of Classification Search
CPC ............... F16F 2222/08; F16F 2228/04; F16F 2228/066; F03D 80/88; F03D 80/881; F03D 80/005; F05B 2260/964; Y02B 10/30; Y02E 10/72
See application file for complete search history.

(56) References Cited

U.S. PATENT DOCUMENTS

| | | | |
|---|---|---|---|
| 8,215,620 | B2 | 7/2012 | Krauss |
| 8,322,975 | B2* | 12/2012 | Kawabata ................ F16F 7/10 415/126 |
| 10,316,512 | B2* | 6/2019 | Dörsam .................. E04H 12/00 |
| 10,400,754 | B2* | 9/2019 | Rodriguez Tsouroukdissian ........ F16F 15/02 |
| 10,774,893 | B2* | 9/2020 | Bergua ................... F03D 13/25 |
| 11,732,690 | B2* | 8/2023 | Mitsch ................... F16F 7/1011 416/144 |
| 2001/0048875 | A1* | 12/2001 | Cardin ................. F16F 15/1471 415/119 |
| 2010/0314883 | A1* | 12/2010 | Ollgaard ................. F03D 80/00 290/55 |
| 2012/0304808 | A1* | 12/2012 | Amano ............... F16F 15/1457 74/574.2 |
| 2015/0322923 | A1* | 11/2015 | Könitz ................... E04H 12/08 188/380 |
| 2016/0215754 | A1* | 7/2016 | Seidel .................. E04H 9/0215 |

FOREIGN PATENT DOCUMENTS

| | | | | |
|---|---|---|---|---|
| CN | 115059731 | A | * | 9/2022 |
| EP | 1008747 | A2 | * | 6/2000 ............. F03D 13/20 |
| EP | 2 378 118 | A2 | | 10/2011 |
| EP | 2 522 850 | A1 | | 11/2012 |
| EP | 2 097 279 | B1 | | 7/2018 |
| KR | 20170068760 | A | * | 6/2017 |

OTHER PUBLICATIONS

Written Opinion Corresponding to PCT/EP2021/025055 dated Aug. 5, 2021.

* cited by examiner

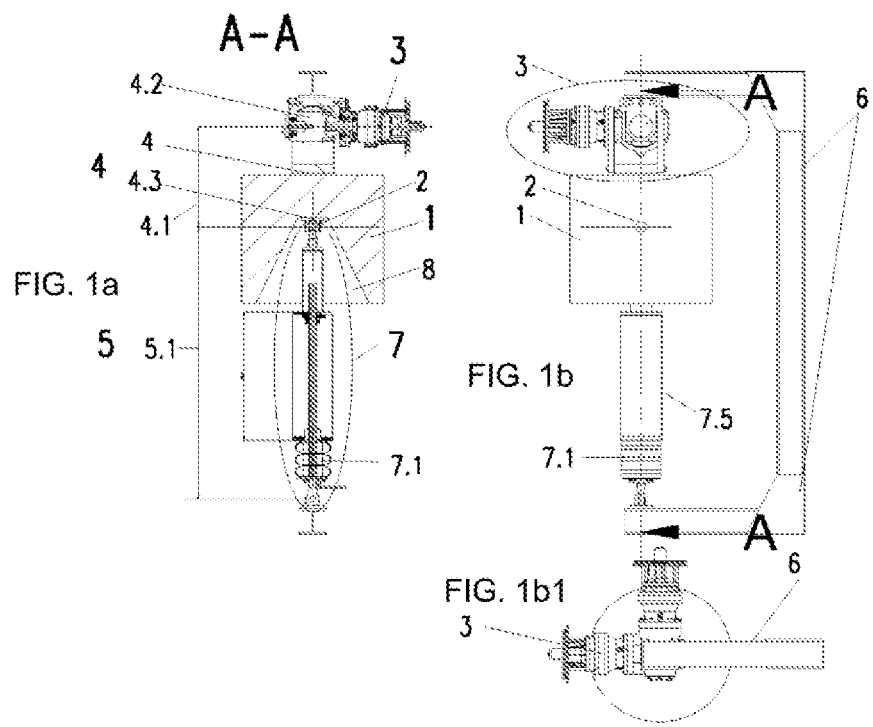
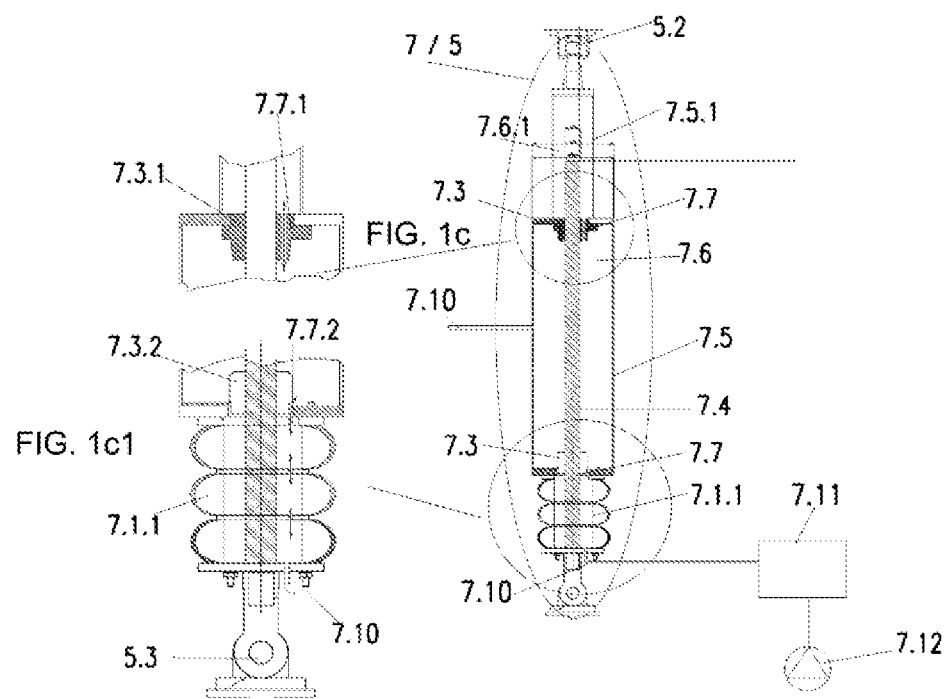

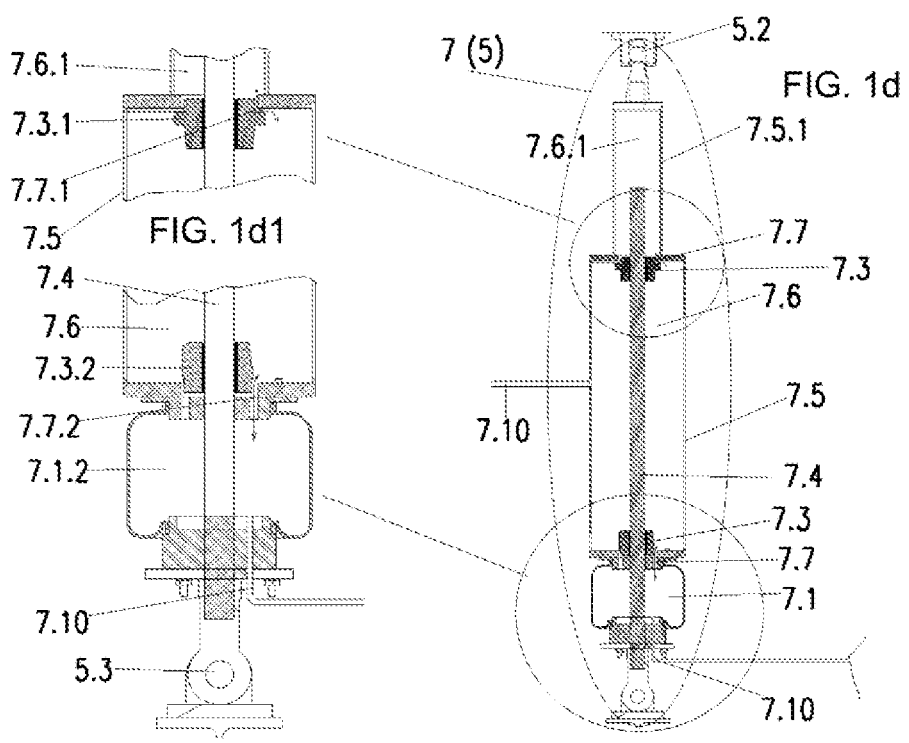
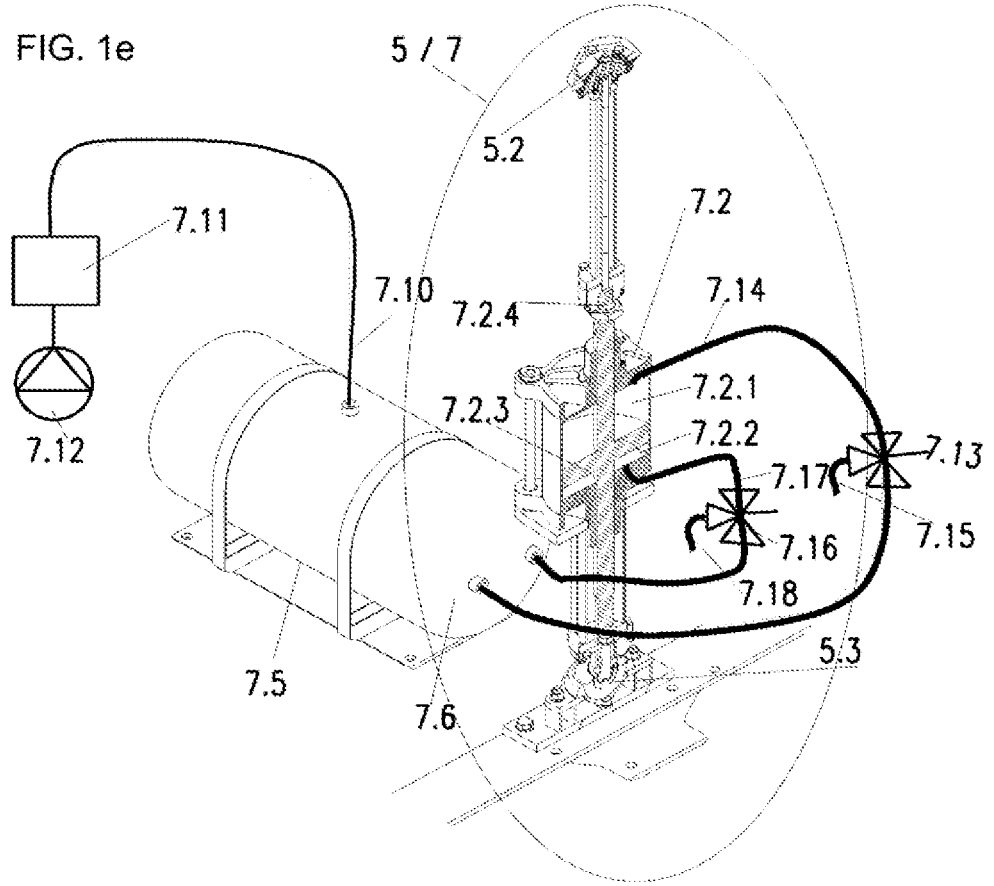

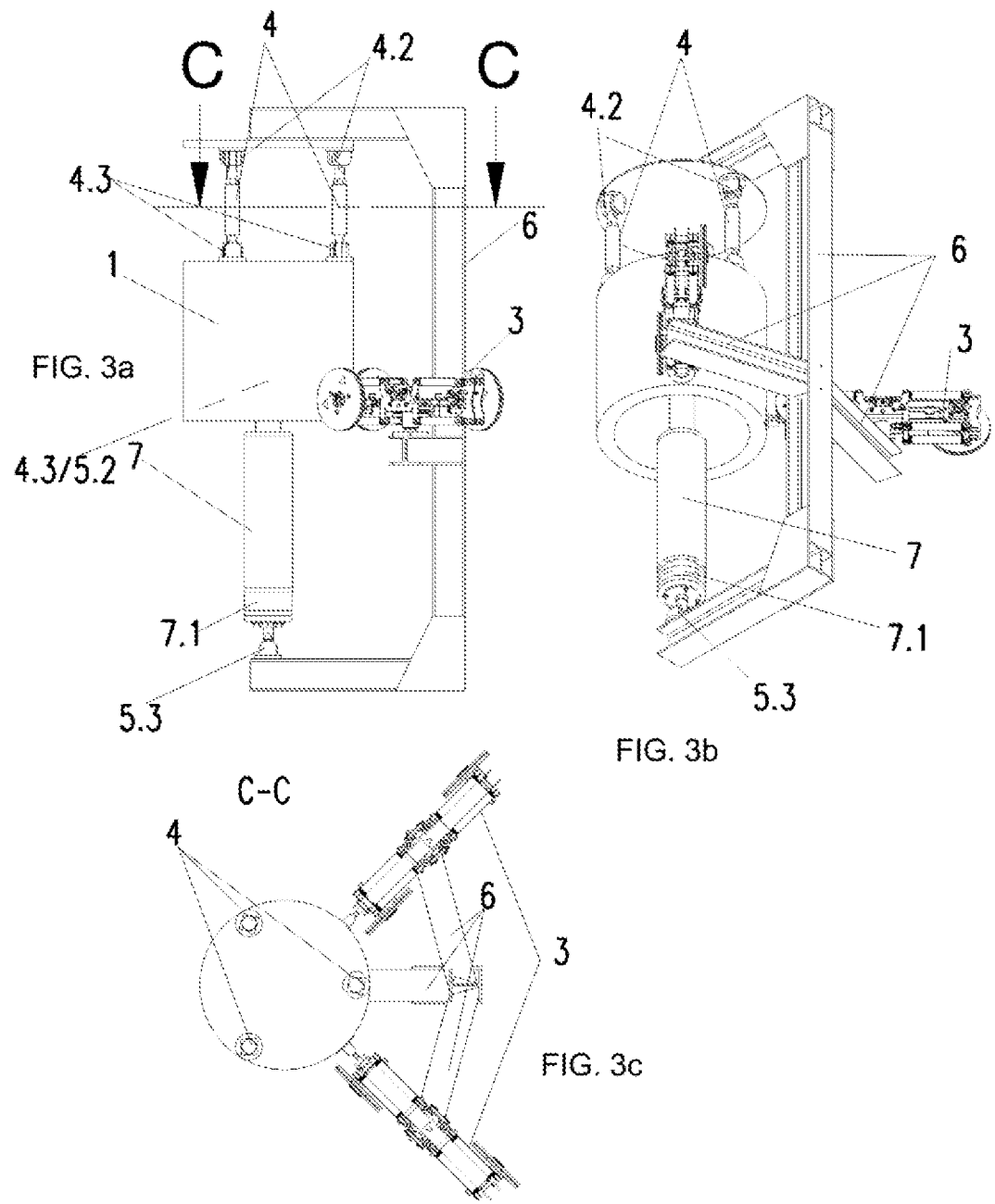

ADAPTIVE TUNED MASS DAMPER FOR DAMPING LOW EXCITATION FREQUENCIES

FIELD OF THE INVENTION

The invention relates to a new type of frequency-adaptable tuned mass damper which is suitable in particular for damping different oscillations <2 Hz—in particular, <1 Hz, and preferably <0.5 Hz—and thus can be used preferably as a construction damper when building or siting high, narrow structures, such as wind-turbine towers, but also as permanent dampers.

The invention relates in particular to a pendulum-tuned mass damper having a first pendulum, to which an oscillation mass is attached, and a second pendulum, which is formed by a spring-like support device of different design and is operated using a gas-air volume in such a way that, with the aid thereof, the weight of the mass is influenced, and the frequency of the oscillation system can thus be adapted and adjusted.

BACKGROUND OF THE INVENTION

High, narrow structures are usually exposed to different forces, which cause different oscillation states, as a result of which different frequencies have to be damped. This is the case in particular with the erection of a high, narrow structure. The construction of a high, narrow structure, such as a wind turbine consisting of tower, nacelle, and rotor blades, can easily last for a longer period of time, so that weather-related excitation states or excitation states occurring for other reasons can lead to undesirable oscillations of the installation under construction.

For example, the tower of a wind turbine alone has a natural frequency of up to approximately 0.6 Hz. In contrast, a completely erected wind turbine has natural frequencies of less than 0.15 Hz. Such low frequencies generally cannot be achieved, or can be achieved only with great effort, with the usual pendulum-tuned mass dampers with their heavy masses and conventional lengths of the pendulum cables or pendulum rods.

In order to achieve low frequencies, it is possible to allow a mass to roll back and forth between radially-arranged springs. This is possible in one direction with a trolley and in two directions with ball casters. However, for this purpose, the stiffness of the radial springs must be changed or adapted, which is associated with some effort. If, on the other hand, a conventional pendulum is used in a tuned mass damper, the required pendulum length for achieving frequencies of less than 0.15 Hz would already be more than 11 m, which can be realized in practice only with great effort and a large space requirement.

Another possibility for addressing such low frequencies in tuned mass dampers is the use of pulse dampers. However, the latter require approximately three times the mass as pendulum dampers and must be moved on rollers to achieve the low frequencies, which would necessitate the use of ball casters, which are susceptible to wear. In addition, for these low frequencies, such a pulse damper must be aligned exactly in the horizontal, which is only possible to a limited extent in practice, since an oblique position, which would significantly interfere with the function, cannot always be avoided. Since only small accelerations are achieved or are present at low frequencies, the oscillation cannot be reduced with a pulse damper as much as is usually the case with pendulum dampers.

The object was thus to provide a tuned mass damper for sufficiently large masses, but with the smallest possible oscillation paths, which damper is able to address and dampen variable low frequencies below 2 Hz, and preferably below 0.5 Hz.

SUMMARY OF THE INVENTION

The object was achieved by providing a pendulum-tuned mass damper in which, according to the invention, the weight of the pendulum mass during the pendulum movement can be objectively or relatively decreased or increased by a specially developed supporting spring element, and can thus be adapted in a targeted manner to the natural frequency of the oscillation system.

A pendulum functions due to gravity acting on the mass. The higher the weight caused by gravity is, the higher the natural frequency is with the same pendulum length. With the same mass (weight), the frequency is also higher, the shorter the pendulum length is. In order to reduce the weight of a specific pendulum mass, it is necessary to raise the mass continuously over the entire oscillation path, with only minimal influence of other forces, in order to relieve the weight. A selective lowering of the natural frequency of the oscillation system can thus be achieved. This is accomplished according to the invention by a counter pendulum acting from below or, optionally, from above on the pendulum mass, as described below. Conversely, with the aid of the pendulum-tuned mass damper according to the invention, it is also possible, if necessary, to increase the weight of the pendulum oscillation mass, in order to thus raise the natural frequency of the oscillation system in a targeted manner.

The pendulum-tuned mass damper according to the invention can thus be adjusted in a controlled manner to the respective natural frequency of the oscillation system—in particular, in the case of high, narrow structures—wherein, in particular, frequencies of <2 Hz, e.g., between 0.15 and 1.5 Hz, are important.

The subject matter of the invention is thus an adaptive pendulum-tuned mass damper for adaptable damping of occurring oscillations of low frequencies <2 Hz—preferably <1.5 Hz—in high, narrow structures, comprising (i) at least one first pendulum rod (4), which has a length (4.1), is arranged perpendicularly in the idle state, and is connected at its one end via a joint (4.2) directly or via a carrier element (6) to the structure to be damped, (ii) at least one second pendulum rod (5), which has a length (5.1), is arranged perpendicularly in the idle state, is arranged entirely or partially below or above the first pendulum rod (4), and is connected at its one end via a joint (5.3) directly or via a carrier element (6) to the structure to be damped, wherein said first pendulum rod (4) is connected at its free end (4.3) via a common, freely-movable joint (4.3)(5.2) directly or indirectly to the free end (5.2) of the second pendulum rod (5), (iii) an oscillation mass (1), which is attached to the first pendulum rod (4) so that the two pendulum rods (4)(5) are moved together when force acts on the mass (1), and (iv) a pressurized and pressure-controlled support device (7), which can increase or reduce the weight of the oscillation mass (1) by raising or lowering, or relieving or loading, and frequency changes can thus be selectively achieved, wherein the support device is an integral component of the second pendulum rod (5), or the support device functions as a pendulum rod.

In a preferred embodiment of the invention, the support device (7) is operated by a gas/air volume (7.6) under pressure, wherein the pressure is selected such that it brings about a specific change in weight of the oscillation mass (1), i.e., raises or lowers, or relieves or loads, the latter by a specific amount. The gas-air volume (7.6) is located in a gas/air container (7.5), which is either an integral component of the support device or, if the available volume is not sufficient for this purpose, is mounted in a separate container outside the actual support device (7). In the latter case, the separate container is connected to the actual support device (7) by means of appropriate lines/tubes (7.10)(7.14)(7.15)(7.17)(7.18).

According to the invention, the support device is preferably an air spring element (7.1) or a pneumatic cylinder (7.2), wherein the pneumatic cylinder acts here like an air spring.

The air spring unit (7.1) can be an elastic bellows (7.1.1) or an arrangement of several elastic bellows stacked one above the other with a preferably small cross-section, or a roller bellows (7.1.2).

Preferably, the air spring unit (7.1) is represented by a pneumatic cylinder (7.2) with a separate gas/air volume/container (7.6)(7.5).

It is generally advantageous to select the entire gas volume (7.6) to be large enough that, during operation of the tuned mass damper, a maximum of 10%, and preferably no more than 5 to 8%, of the total available volume is displaced or shifted by the support device during a pendulum movement. The less volume (7.6) is shifted during operation, the better this is for the function of the tuned mass damper or for the selective frequency adaptation. It is therefore conducive to the effect of the damper if the volume in the gas container (7.5) is as large as possible in comparison to the volume displaced by the support device (7). In this case, the container (7.5) is to be understood to mean the entire space that the gas (7.6) occupies, i.e., in the actual support device itself and also, optionally, in a container separate therefrom.

In the case of an elastic bellows as an air spring unit (7.1), it can therefore be advantageous if, during the pendulum movement of the damper, the air spring unit comprises several—e.g., an arrangement of three to ten—elastic bellows (7.1.1) stacked on top of one another, the cross-section of which is as small as possible in relation to the entire gas volume (7.6).

For this purpose, an additional container can optionally be provided outside the supporting spring unit (7), in order to contribute to the relative reduction of the displaced volume in relation to the total volume.

In an advantageous embodiment of the invention, the pendulum-tuned mass damper according to the invention comprises a pressure-regulating unit (7.11), which is operated, optionally, automatically and equipped with corresponding sensors, whereby pressure fluctuations caused by changed external conditions during operation can be compensated for by increasing or lowering the gas/air pressure (7.6) in the container (7.5) by supplying or discharging gas/air via corresponding ports (7.10). The natural frequency of the tuned mass damper or of the oscillation system can thus be adapted to the changed conditions. In this case, it is sensible for the system to carry out an automatic adaptation of the pressure only if a specific preset maximum or minimum pressure is exceeded.

It has been shown to be advantageous if the lengths (4.1)(5.1) of the two interconnected pendulum rods (4)(5) are different. Preferably, the length (4.1) of the at least one first, e.g., upper, pendulum rod (4) is smaller than the length (5.1) of the second, e.g., lower, pendulum rod (5) or the support device (7). Preferably, the second (lower) pendulum rod (5) or the support device (7) or the supporting spring unit (7.1) is thus 1.5 to 2 times, or 50-100%, longer than the at least one first pendulum rod (4).

In one embodiment of the invention, the at least first pendulum rod (4) entirely or partially constitutes an upper pendulum, and the at least second pendulum rod (5) entirely or partially constitutes a lower pendulum, and the two pendulum rods are interconnected via a common joint (4.3)/(5.2).

Alternatively, the at least first pendulum rod (4) entirely or partially constitutes a lower pendulum, and the at least second pendulum rod (5) entirely or partially constitutes an upper pendulum, and the two pendulum rods are interconnected via a common joint (5.2)/(4.3).

It has furthermore been shown that the pendulum-tuned mass damper according to the invention can be adapted particularly well and selectively to a low frequency if the oscillation mass (1) is positioned on the pendulum rod (4) such that the center of gravity of the mass (2) is located in proximity to the joint (4.3)(5.2) or coincides with the position thereof.

Preferably, the oscillation mass (1) is designed such that the support device (7) or the air spring unit/supporting spring unit (7.1) is at least partially surrounded by the oscillation mass while maintaining the free mobility of the second pendulum rod (5)(5.1). This can be achieved by a correspondingly positioned recess or a free space (8) on the oscillation mass (1), into which the support device (7) projects at least with its upper part far enough that, as mentioned above, the joint (5.2)(4.3) of the pendulum rod (5)(5.1) is positioned in the region of the center of gravity (2) of the oscillation mass (1). In order to save space, the air spring unit/supporting spring unit (7.1) can be tapered at the end directed toward the joint (5.2), so that it fits well into a smaller recess (8) in the oscillation mass (1).

The term, "supporting spring unit," is used synonymously below for the air spring unit (7.1).

The invention also relates to a preferably two-dimensionally effective, adaptive pendulum-tuned mass damper for high, narrow structures, e.g., wind-turbine towers, for damping occurring oscillations of low frequencies—
in particular, in the range of 0.1 to 1.5 Hz, and preferably 0.1 to 1.0 Hz—which in particular comprises the following elements:

(i) an oscillating mass (1), (ii) at least one first, preferably upper, pendulum rod (4)(4.1), which is mounted perpendicularly in the idle state and has an upper, articulated attachment point (4.2) and a lower attachment point (4.3) at which the oscillation mass (1) is mounted rigidly or optionally in an articulated manner, depending upon the embodiment, (iii) optionally, at least one damping unit (3), e.g., an elastic, pneumatic, hydraulic, or magnetic damper, and (iv) at least one support device (7) designed as a supporting spring unit (7.1), which is a component of a second, preferably lower, pendulum rod (5)(5.1) and is functionally connected to the oscillation mass (1) on the first pendulum rod and is arranged entirely or partially below the mass (1), wherein the two pendulum rods are interconnected via a common joint (4.3)(5.2).

In this embodiment of the invention, the supporting spring unit (7.1) comprises the following elements: (a) an integrated pressure-resistant gas or air container or reservoir (7.5) for receiving a gas or air volume (7.6) with an inlet/outlet device (7.10); (b) an elastic bellows (7.1.2) or an arrangement of elastic bellows stacked one above the other, for generating a lifting force or, optionally, a lowering force, which is connected to the gas volume (7.6) and changes its rigidity and size according to the preset gas pressure, wherein the gas pressure in the container (7.5) and in the air spring unit is adjusted such that, in comparison to the pressure-free or pressure-reduced state, the oscillation mass (1) is relieved in the vertical direction or in the direction of the oscillation mass (1), e.g., by increasing the air pressure and thus the lifting force of the air spring unit (7.1), as a result of which the weight of said oscillation mass is reduced as a function of the preset pressure; and (c) an upper, freely-movable joint (5.2).

In this embodiment, this joint in principle constitutes the upper joint of the lower pendulum rod, which is represented here by the supporting spring unit (7.1), and, on the other hand, is identical to the joint (4.3) of the upper pendulum rod (4) here. The two pendulum rods are thus also interconnected here by a common, freely-movable joint (4.3)(5.2).

The support device (7) or the supporting spring unit (7.1), or the here lower pendulum rod (5), furthermore has a lower joint (5.3) which is connected to a carrier element (6) of the high and narrow structure. This joint (5.3) can be designed as a ball joint or also as a Cardan joint. In this embodiment, the supporting spring unit (7) thus functionally constitutes a second pendulum rod (5)(5.1), which is moved together with the first pendulum rod (4)(4.1) to which the mass (1) is attached.

In this embodiment, the pendulum-tuned mass damper according to the invention thus comprises at least one, first, upper, rigid pendulum rod (4), to which the mass (1) is attached, and a second, lower pendulum rod (5), which acts substantially below the mass (1), in the form of the mentioned supporting spring unit (7) which generates a lifting force and is carried and moved together with the oscillating mass (1).

In a further embodiment of the invention, the tuned mass damper according to the invention is designed as a transverse pendulum damper. If such a tuned mass damper is to act two-dimensionally, it has three or more, first, upper or lower pendulum rods (4), on which the oscillation mass (1) is suspended in the region of the respectively lower or upper joint (4.3), and the mass (1) is connected to the second lower or upper pendulum rod (5), to the air spring/supporting spring unit (7), via the upper or lower joint (5.3), so that the oscillation mass (1) can be moved horizontally during the pendulum movement.

The tuned mass dampers according to the invention, preferably, additionally have one or more damping units (3). In this case, hydraulic, pneumatic, elastic, or magnetic dampers can be used, which are known per se in the prior art. In the specific case, rotational dampers—in particular, magnetic rotational dampers—have been shown to be particularly suitable. Corresponding (magnetic) rotational dampers are described, for example, in WO 2017/036581, in WO 2019/154557, or in WO 2019/029839.

In one embodiment (above) according to the invention, the damping unit (3) is mounted in or on the joint (4.2) of the pendulum (4). A Cardan joint with an integrated damping unit, as is described in WO 2019/201471, can advantageously be used here.

Further damping units (3), both in number and thickness, can also be mounted on the circumference of the oscillation mass in such a way that they can dampen oscillations from all directions of the horizontal plane of the tuned mass damper according to the invention. In the transverse pendulum dampers described, mounting the damping units (3) between the mass (1) and the carrier unit (6) is sensible.

The tuned mass dampers according to the invention are in particular provided to be used in the erection or the deconstruction of the high, narrow structures. In particular, in the erection of towers or tower segments in wind-turbine construction, oscillations in the low frequency range of below 2 Hz, and in particular in the range between 1 and 1.5 Hz, occur, depending upon the construction progress. Since the assembly of the installations often lasts for a longer period of time, oscillation damping in this time period is quite sensible. After the complete installation has been erected, such a tuned mass damper can then often be dispensed with, even if it can in principle be used during the operation of the installation.

It is therefore provided to make available a tuned mass damper according to the invention which is mounted on a mobile carrier structure (6) which, in turn, can be reversibly attached to a structure, e.g., to a wind-turbine tower, or removed during the erection or the deconstruction thereof. For this purpose, it is proposed according to the invention to equip the structure to be damped or the corresponding part or segment of the structure with an attachment device for the pendulum-tuned mass damper according to the invention. In one embodiment, this attachment device can be a simple suspension structure which is connected in a fixed manner to the structure to be damped.

Essentially, the support device (7) is thus responsible for changing the weight of the oscillation mass (1). In a special variant already outlined above, the support device, as part of the pendulum-tuned mass damper according to the invention, can be referred to as independently innovative.

The subject matter of the invention is thus a supporting spring device for a mass with a lifting force adaptable by gas pressure, comprising (a) a first, optionally articulated, connection point for a mass (1) to be changed with respect to its weight, and a second opposite, optionally articulated, connection point for a carrier structure (6); wherein the elements of features (b) through (d) are arranged between the two connection points, and the mass (1) and the carrier structure (6) are arranged above and below, (b) at least one pressure-resistant container (7.5), which contains a gas or air volume (7.6) which can be supplied or discharged through an inlet/outlet device (7.10), wherein the container is preferably designed as part of the support device, (c) at least one elastic air spring element (7.1)(7.1.1) (7.1.2) above or below the container (7.5), which element is functionally connected to the gas volume in the container (7.5) and changes its stiffness and size according to the preset gas pressure, whereby an increase or a lowering and thus a change in the lifting force of the air spring element along the longitudinal axis of the support device (7), and thus a raising or lowering of the mass (1), is brought about, (d) a guide rod (7.4) for guiding and holding the gas/air container (7.5) and the elastic air spring element (7.1) 7.1.1)(7.1.2), wherein the guide rod has a sliding bearing (7.3) between the air spring element (7.1)(7.1.1) (7.1.2) and the gas/air container (7.5) so that, by changing the lifting force of the air spring element, the gas/air container (7.5) can correspondingly move vertically along the guide rod and can thus influence the weight of the mass, and, optionally, (e) a pressure-regulating and control unit (7.11)(7.12) for adapting the gas/air pressure.

For the size of the gas/air container and the function of the component, the same specifications apply as were given above in connection with the tuned mass damper.

Such a supporting spring device can be used for many purposes.

BRIEF DESCRIPTION OF THE DRAWINGS

Below, the invention is explained with reference to the example embodiments illustrated in the figures, which show:

FIG. 1*a*: a side view of a pendulum-tuned mass damper according to an embodiment the invention;

FIG. 1*b*: a side view of the embodiment according to FIG. 1*a* rotated by 90°;

FIG. 1*b*1: a top plan view of FIG. 1*b*;

FIGS. 1*c*, 1*c*1: further details of a support device according to the embodiment of FIG. 1*a*;

FIGS. 1*d*, 1*d*1: a further embodiment of a pendulum-tuned mass damper according to the invention including an elastic bellows;

FIG. 1*e*: a further embodiment of the pendulum-tuned mass damper according to the invention including a pneumatic cylinder;

FIGS. 3*a*-3*c*: show various views of a further embodiment of the pendulum-tuned mass damper according to the invention;

DETAILS OF THE INVENTION AND DESCRIPTION OF THE EMBODIMENTS

Figure 2A:
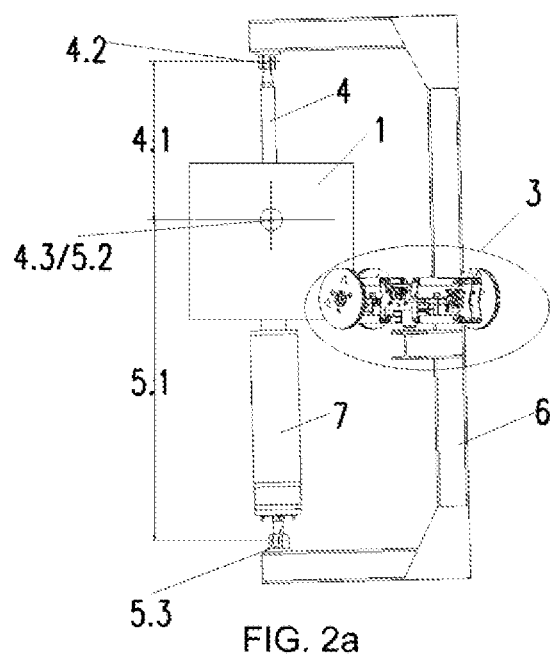
FIGS. 2*a*-2*c*: show various perspective views of the embodiment of the pendulum-tuned mass damper according to FIG. 1 with an air spring unit.

As already explained in the introduction, it is necessary to raise or relieve the mass continuously over the entire oscillation path, with only minimal influence of other forces, in order to, for example, reduce the weight of a specific pendulum mass and thus the frequency. This is accomplished according to the invention by a counter pendulum (5) which acts on the mass from below, for example. This counter pendulum is conceived and designed as a support device (7) or at least as an air spring unit (7.1).

The use of an air spring unit (7.1) in the form of an air-filled elastic bellows or of a package made of stacked elastic bellows (7.1.1), or as a pneumatic cylinder (7.1.2), is suitable here. However, a spring unit made of steel bellows can also be used.

However, it should be noted that, when a closed bellows filled with gas (for example, air) is used, the force changes during the oscillation path, which is similar to a spring, as a result of which the oscillating frequency is increased again to the same extent.

According to the invention, an appropriate air spring is therefore used, which is connected to an air or gas volume and can be compressed by supplying gas/air. If the air volume is large enough in comparison to the volume of the air spring unit, the compression of the air no longer has any considerable influence.

If the entire air volume V of the supporting spring unit, which is composed of the volume of the gas reservoir V1 and the volume V2 displaced by the air spring, is quite large in comparison to the displaced volume V2, the quotient (V1+V2)/V1 approaches the number 1 such that the compression of the air has no or only a small influence on the existing stiffness of the supporting spring. With the same V2, the quotient assumes smaller values by increasing V1. If, for example, 4 L are displaced by the pendulum movement, and the content of the tank is 80 L, (V1+V2)/V1=84/80=1.05, which corresponds to a sufficiently small force amplitude. If V1 is increased to 100 L, a value of 1.04 is achieved. This means that, during a pendulum movement, 5 or 4% of the total gas volume is displaced by the air spring unit (7.2).

Ideally, the gas storage tank (7.5) is integrated into the lower pendulum rod. However, a separate additional tank, co-oscillating or stationary, can also be used to receive the air volume. This additional tank must then be connected by means of an appropriate pipeline to the air spring unit (7.1). In the case of a co-oscillating reservoir, this can be a fixed pipeline. In the case of a separately mounted reservoir, a flexible tube (7.10) is required.

With a large force application to or relief of the mass (1) by the lower pendulum rod (5), for example, the mass tends to evade the force, which results in a circular movement of the pendulum, and thus in turn in an increase in frequency which is undesirable here. It is therefore advantageous to keep the first pendulum rod (4) significantly shorter or longer than the second pendulum rod (5). The pendulum restoring force of the first pendulum rod is thus greater than that produced by the force of the transverse component occurring on the second pendulum rod, so that a linear oscillating movement is again achieved. It has now been shown that it is advantageous to design the second pendulum rod (5) with the support device (7), for example, to be longer by a factor of 1.5 to 2 than the upper pendulum rod (4). However, it is also possible to make the second pendulum rod (5) correspondingly shorter.

The natural frequency of the system is reduced by raising or relieving the mass via the gas pressure. If the bellows becomes pressure-less, the frequency of the first (short) pendulum (4) is achieved. With 0.8 m pendulum length (4.1), for example, the pressure-less frequency of the system is approximately 0.56 Hz. This frequency can be reduced by injecting gas (air) into the system. For example, a frequency of 0.1 Hz can be achieved at a pressure having the effect of approximately 70% of the weight of the pendulum. The frequency can also be influenced by the pendulum length (4.1). Thus, the system can be used as a frequency-adaptive damper.

In specific embodiments of the support device (7), e.g., with the pneumatic cylinder (7.2), it is, conversely, also possible, by means of pressure against the oscillation mass (1), to increase the weight thereof relatively, which leads to a (relative) increase in the natural frequency of the oscillation of the pendulum. The oscillation system can thus be adjusted in terms of frequency to both higher and lower values.

In the case of oscillations with variable frequency, such as wave excitation by wind turbines or also ships and other offshore constructions, the frequency of the excitation can be measured by sensors, and the system can also be adapted, proportionally to this frequency, to the disturbance frequency by varying the air pressure in the support devices (7).

FIGS. 1 (a-e) show various embodiments of the invention, which each have a (first) upper pendulum rod and a second (lower) pendulum rod (5), wherein the support device is designed as part of the second (lower) pendulum rod, and has either an air spring unit (7.1), in the form of an elastic bellows (7.1.1) or roller bellows (7.1.2), or, alternatively, a pneumatic cylinder (7.2).

FIG. 1(a) is a side view of the pendulum-tuned mass damper according to the invention. The oscillation mass (1) is on an upper first pendulum rod. The joint (4.3)(5.2) connects the first pendulum rod to a second, lower pendulum rod (5) having the length (5.1). The oscillation mass (1) is in this case designed on its underside such that it not only surrounds the upper part of the supporting spring unit (7) but also leaves such a large amount of free space (8) that it can participate in the pendulum movements without abutting. For this purpose, a corresponding bore or recess can be provided in the mass, but the mass can also be joined together from correspondingly shaped and arranged individual elements around the free space (8).

Figure 2B:
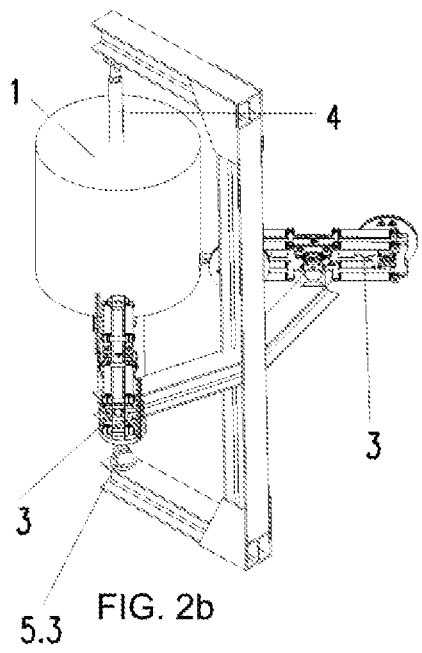
Figure 2C:
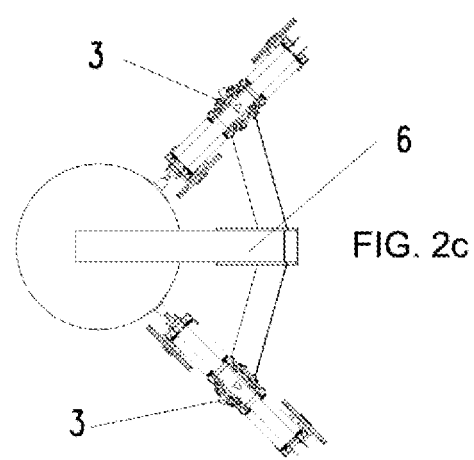

The upper pendulum rod (4) with the length (4.1) has an upper joint (4.2), via which it is connected to the carrier unit of the system (not shown). In this embodiment, the upper joint is a Cardan joint, into which a rotational damper (3) is additionally integrated. Such a damper joint is known, for example, from WO 2019/201471. In principle, however, simple and undamped joints, such as ball joints, can also be used (FIG. 2). The upper pendulum is formed by the length between the rotational axes of the Cardan joint and the center of gravity (2) of the mass (1), which center of gravity is preferably located in proximity to the joint (4.3)(5.2) or is identical thereto. The lower pendulum rod (5) having the length (5.1) is represented by the support device (7). The support device in this case comprises an air spring unit (7.1) with integrated gas/air containers (7.5), in which a gas/air mixture (7.6)(7.6.1) is located. The container (7.5) is tapered in the upper part (7.5.1) so that this part can be inserted more or less deeply into the free space (8) of the mass (1) and is freely movable there together with the pendulum rod (5). The pendulum rod (5) ends in the upper part with the joint (5.2)(4.3). In the optimal case, the position of this joint should be at the center of gravity (2) of the mass.

The support device (7), as an integral component of the lower pendulum rod (5), has, at the lower end, a further joint—preferably a ball joint—which establishes the connection to the structure to be damped or to the carrier element (6) of the structure. However, the connection to the carrier unit is not shown here.

The different lengths (4.1)(5.1) of the pendulum rods (4) and (5) also emerge from the drawing.

FIG. 1(b) is a side view, rotated by 90°, of the embodiment of FIG. 1(a).

In addition, a carrier arrangement or a carrier frame (6) is shown here, which is connected via the joints (4.2) and (5.3) to the complete pendulum-tuned mass damper according to the invention.

FIG. 1(b1) is a plan view of FIG. 1(b), and specifically a Cardan joint with connection to a carrier structure (6), wherein the Cardan joint is equipped with two rotational damper units (3) which are arranged offset to one another at a 90° angle.

FIG. 1(c)(c1) shows further details of the support device (7) according to the invention of FIG. 1(a). The component is composed of the container or reservoir (7.5) for receiving a gas or air volume (7.6) via an inlet/outlet device (7.10). The container (7.5) is divided here into an upper, narrower container part (7.5.1) with a corresponding volume (7.6.1) and a larger, lower container part (7.5) with the volume (7.6). The two container parts are interconnected in terms of pressure via a gas passage (7.7.1). Instead of the division into an upper, small and a lower, larger compartment, it is also possible to use a single continuous, but upwardly tapered container in order to have sufficient space in the free space (8) in the region of the mass (1).

Arranged in the lower region of the support device (7) is the air spring unit (7.1), which is connected in terms of pressure by a lower gas passage (7.7)(7.7.2) to the container (7.5) or via an upper gas passage (7.7)(7.7.1) to the additional container (7.5.1). In this variant, the air spring unit (7.1) comprises three elastic bellows (7.1.1) which, when pressure changes in the containers (7.5)(7.5.1), expand or are compressed correspondingly in the vertical direction, and thus cause the weight of the mass (1) (not shown here) positioned above and attached to the pendulum rod (4) to change correspondingly.

Usually, 1 to 15, and preferably 3 to 10, such bellows stacked on top of one another are used, to enable the required reduction in the weight of the mass (1). Ultimately, this depends upon the mass, the volumes (7.6)(7.6.1), and the volume displaced by the elastic bellows.

The lower end of the support device (7) in turn has a ball joint (5.3), which is connected to the carrier structure of the oscillation system (not shown here).

In this embodiment, the support device (7) conceived as a supporting spring unit also has a guide rod (7.4), which serves to provide sufficient stability to the component, since it would otherwise bend in the region of the bellows under load. The guide rod (7.4) is preferably guided in sliding bearings (7.3)(7.7), wherein, in the specific case, an upper sliding bearing (7.3.1) between lower container (7.5) and upper container (7.5.1) and a lower sliding bearing (7.3.2) between air spring unit (7.1.1) and lower container (7.5) are used.

The air port (7.10) can be connected in any position of the air-filled or gas-filled space (7.6)(7.6.1). It is advantageous to mount it in the lower region of the supporting spring unit, in which little movement takes place. At the same time, a further container for increasing the volume can be connected by means of a tube or a pipe connection. A further inlet/outlet device (7.10), which has a regulating unit (7.11), is provided at the lower end of the supporting spring unit. In the simplest case, this is a regulating valve.

The supporting spring unit described here functions in such a way that, by a vertical change of the volume of the elastic bellows (7.1.1), the part of the superjacent unit with the gas/air container (7.5)(7.5.1) is pushed along the guide rod (7.4) in the direction of the joint (5.2). Since the joint (5.2), which is preferably designed as a ball joint, is here identical to the joint (4.3) of the upper first pendulum rod (4) to which the oscillation mass (1) is attached, the corresponding compressive or tensile force is thus exerted on the oscillation mass (1), so that a targeted frequency adaptation to the oscillation system can thereby be carried out.

Another possibility is to install an automatic pressure-regulating unit, with the aid of which the preset pressure in the spring system (7) can be adapted manually or automatically, and possibly with the aid of sensors, to the changed natural frequency when the external conditions in the oscillation system change. On the one hand, this has the advantage that pressure changes caused by possible temperature fluctuations, for example, can be compensated for. Furthermore, the natural frequency of the tuned mass damper can be continuously adapted to the requirements via such a regulating device (adaptive operation). The pressure-regulating unit for maintaining a constant air pressure can, for example, consist of a pressure sensor, a three-way servo valve, and a compressor. The pressure sensor continuously monitors the pressure in the container (7.5)(7.5.1). The control advantageously takes into account only the maximum pressure which is produced whenever upper and lower pendulum rods are in line with one another, and thus the smallest air volume in the movement sequence is used for regulating. It is also recommended that the adaptation be carried out automatically only if specific maximum or minimum limit values are exceeded or undershot. The regulation compares this pressure to the predetermined setpoint value and opens or closes the valve accordingly in order to increase or decrease the gas pressure in the container via a compressor or via compressed-air reservoirs. The specified setpoint value is either a fixedly adjustable variable, or it is specified for an adaptive operation by a control unit.

The oscillation frequency of the tower is detected by an acceleration sensor. The signal is relayed to a computing unit. The air pressure of the system required to achieve the respective frequencies is calculated in a previously determined frequency-pressure curve of the system. The resulting signal is relayed to the pressure-regulating valve as a setpoint value.

FIG. 1(d)(d1) shows a further embodiment of the invention. Instead of the air spring unit (7.1) designed as an arrangement of elastic bellows (7.1.1), a roller bellows (7.1.2) is now used, which has the advantage that its cross-section does not change significantly during operation. Otherwise, all other features and functions correspond to those of FIG. 1(c)(c1).

FIG. 1(e) shows a further embodiment of the invention, viz., a pneumatic cylinder (7.2) as a component of a lower pendulum rod (5) of the pendulum-tuned mass damper according to the invention. The upper pendulum rod (4) with the oscillation mass (1) is not shown. The pendulum rod (5) has an upper joint (5.2) which is designed as a ball joint. The joint is at the same time the lower joint (4.3) of the upper pendulum rod (4). The pneumatic cylinder (7.2) comprises a piston (7.2.3) which divides the cylinder space into an upper cylinder chamber (7.2.1) and a lower cylinder chamber (7.2.2). The piston (7.2.3) is moved by piston rod (7.2.4). The vertical movement of the piston takes place by means of the pressure-controlled gas/air volume (7.6). Since the cylinder space is too small, an air/gas container (7.5) outside the component is required, to ensure the functionality of the pneumatic cylinder in the sense of a selective and accurate frequency adaptation. Depending upon the requirement, the gas volume in the container (7.5) is fed into either the lower or the upper chamber of the cylinder under pressure. Corresponding valves (7.13)(7.16) and feed and discharge lines (7.10) (7.14) (7.15) (7.17) (7.18) are provided and, here as well, a regulating and control unit (7.11)(7.12) for the gas/air volume (7.6).

During operation, the piston rod (7.2.4) is pushed vertically upwards or downwards by the corresponding gas pressure, as a result of which the oscillation mass (1) on the pendulum rod (4) is relieved or loaded via the ball joint (5.2). Generally, the pneumatic cylinder (7.2) can work in the pull direction and in the push direction. The chamber 7.2.2 is loaded for push, and the chamber 7.2.1 is loaded for pull.

FIGS. 2(a-c) show, from various perspectives, the embodiment of the tuned mass damper according to the invention with an air spring unit (7.1) of FIG. 1 integrated into the carrier structure (6). In contrast thereto, the joint (4.2) of the pendulum rod (4) is a simple ball joint without damping units (3). For this purpose, the latter are installed in duplicate and at a 90° angle to one another between the mass (1) and the carrier structure (6). Rotational dampers are again provided as damping units here, but linear dampers based upon magnets, hydraulic dampers, or other dampers according to the prior art can also be used.

FIGS. 3(a-c) show three different views of another embodiment of the damper according to the invention, viz., a transverse pendulum damper. The mass (1) is here suspended on three pendulum rods (4). Each pendulum rod (4) has an upper (4.2) and a lower joint (4.3)—preferably a ball joint (4.3). The pendulum rods are connected by means of the upper joints to the carrier structure (6) and by means of the lower joints to the mass (1) in such a way that the mass can move exclusively horizontally during oscillation. The damping elements (3) are mounted here between the mass (1) and the carrier structure (6) and, in the specific example, are again designed as rotational dampers, but can also be other dampers of the prior art. For a circumferentially uniform damping, two damping elements (3) are sufficient in this embodiment, with three pendulum rods (4) and six joints (4.2)(4.3) in the upper suspension. However, three and more such dampers can also be used.

FIGS. 4(a-d) show four different views of another embodiment of the transverse damper according to FIG. 3. In the case of the transverse pendulum, the support device (7) conceived as a supporting spring or air spring unit does not necessarily, or at least desirably, have to act at the center of gravity of the mass or in close proximity thereto. It is thus possible to allow it to act above the mass and thus to pass it through the mass; this results in a lower height of the component, which in turn reduces the required installation space.

Figure 4A:
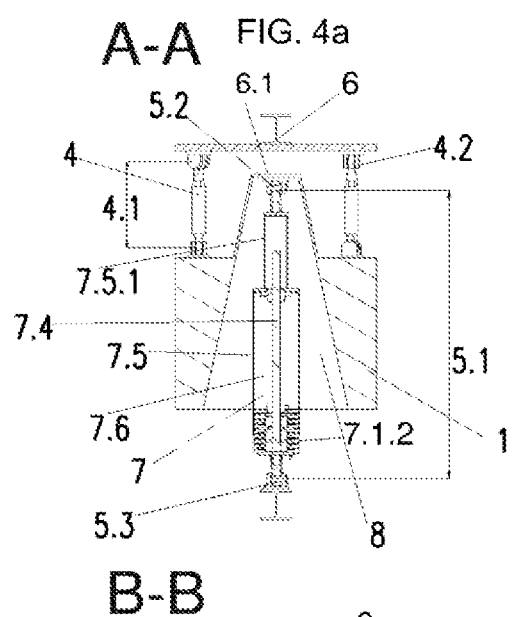
FIG. 4*a*: shows another embodiment of the damper according to FIG. 3.

FIG. 4(a) shows how the supporting spring unit (7) is guided through an opening of the mass (1). The upper joint (5.2) of the pendulum rod (5), which is identical here to the support device (7), is now arranged above the oscillation mass (1) and attached to a holder (6.1), which in turn is connected to the mass. The opening in the mass is designed such that it allows sufficient free space for the movement of the lower pendulum (5) or the supporting spring unit (7). In this embodiment as well, it can be seen that the upper pendulum rods (4) have a significantly smaller length (4.1) in comparison to the length (5.1) of the lower pendulum rod (5).

Figure 4B:
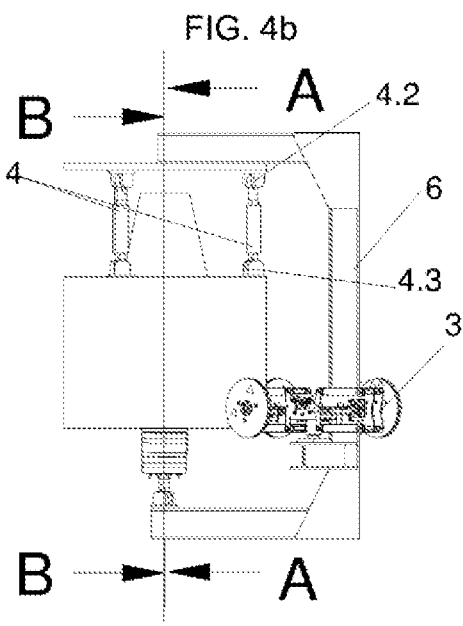
FIG. 4*b*: a side view of the pendulum-tuned mass damper according to FIG. 4*a*.

FIG. 4(b) shows a side view of the tuned mass damper according to the invention according to FIG. 4(a). In addition, a rotational damper unit (3) with three rotary disks can also be seen, which is attached to the mass and is effective in the case of oscillating movement thereof.

Figure 4C:
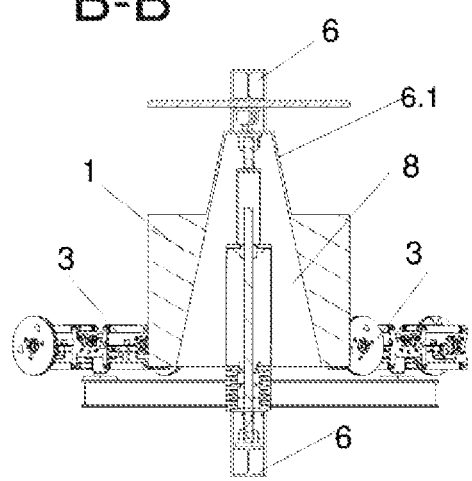
FIG. 4*c*: shows a sectional view of embodiment of the pendulum-tuned mass damper according to FIG. 4*a*.

FIG. 4(c) shows a sectional view of a tuned mass damper according to FIG. 4(a).

Figure 4D:
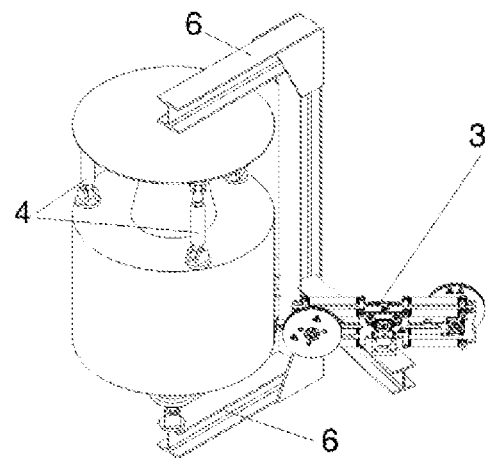
FIG. 4*d*: shows a perspective view of the embodiment of the pendulum-tuned mass damper according to FIG. 4*c*.

FIG. 4(d) shows a perspective view of the component according to FIG. 4(c).

In FIGS. 2-4, the support device (7) in each case comprises an air spring element (7.1) according to the invention. However, it is provided that the same embodiments as shown and described be used, but with a pneumatic cylinder (7.2) according to FIG. 1(e).

Figure 5:
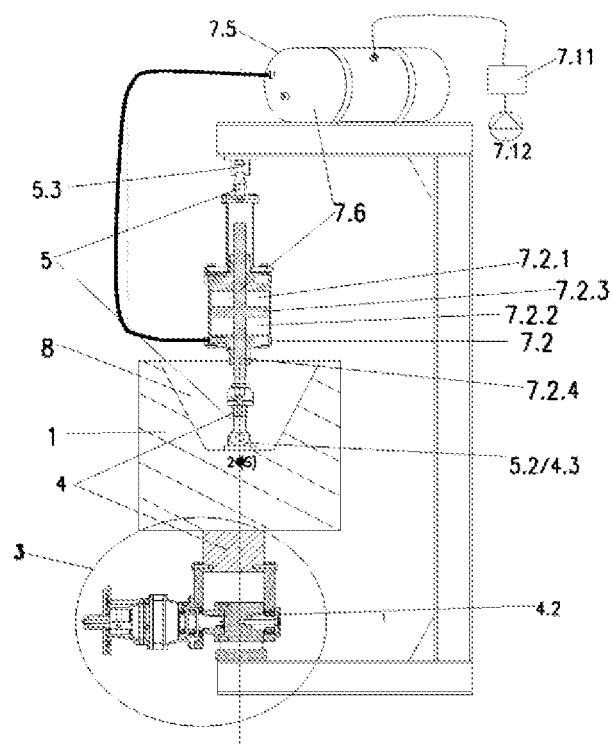
FIG. 5: shows an embodiment of the pendulum-tuned mass damper according to the invention with a pneumatic cylinder.

FIG. 5 shows a pendulum-tuned mass damper according to the invention with a pneumatic cylinder (7.2) as the core piece of the support device (7). In contrast to FIG. 1(*e*), which shows only the second (lower) pendulum rod (5) with the pneumatic cylinder (7.2), the second pendulum rod (5) in this embodiment with a corresponding pneumatic cylinder (7.2) is provided as an upper pendulum rod (5), and the first pendulum rod (4) with the oscillation mass (1) is provided as a lower pendulum rod (4). A ball or Cardan joint (4.2) with a rotational damping element (3) is correspondingly arranged at the lower end of the carrier structure (6), while a freely-movable joint (5.3) now closes the support device upwards and is connected there to the carrier structure. The shape and arrangement of the oscillation mass (1) on the pendulum rod (4) in relation to the arrangement of the pendulum rod (5) corresponds approximately to the corresponding part of FIG. 4.

Figure 6:
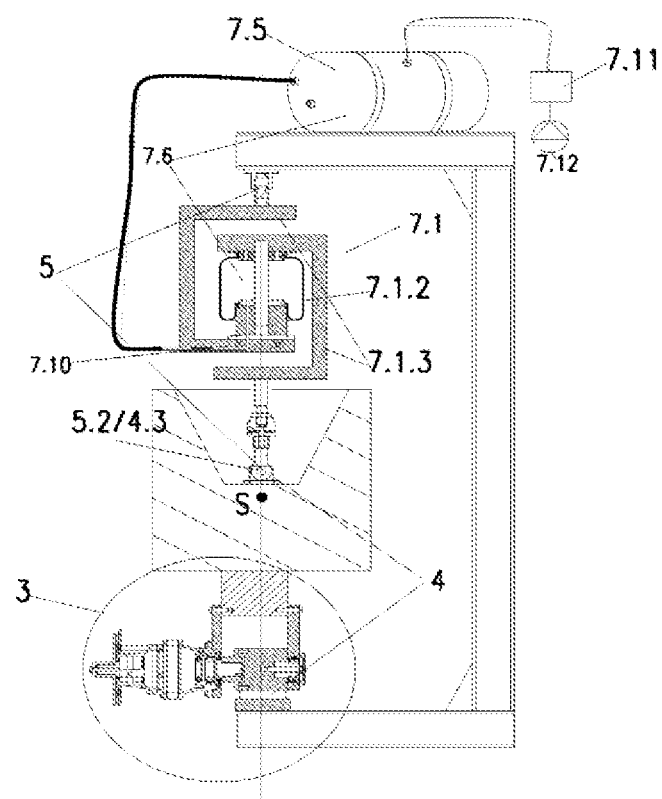
FIG. 6: shows an embodiment of the pendulum-tuned mass damper according to the invention with an air spring unit.

FIG. 6 in principle shows the same arrangement of a pendulum-tuned mass damper according to the invention according to FIG. 5, but the pneumatic cylinder (7.2) is here replaced by an air spring unit (7.1)—in particular, a roller bellows (7.1.2). The latter transmits the force, via the components (7.1.3) movable relative to one another, to the mass (1) on the lower first pendulum rod (4).

The invention claimed is:

1. An adaptive pendulum-tuned mass damper for adaptable damping of occurring oscillations of low frequencies <2 Hz in high, narrow structures, comprising:
   at least one first pendulum rod, which has a length, is arranged perpendicularly in the idle state, and is connected at one end via a joint directly or via a carrier element to a structure to be damped;
   at least one second pendulum rod, which has a length, is arranged perpendicularly in the idle state, is arranged entirely or partially below or above the first pendulum rod, and is connected at one end via a joint directly or via the carrier element to the structure to be damped;
   wherein said first pendulum rod has a free end that is connected via a freely movable joint directly or indirectly to a free end of the second pendulum rod;
   an oscillation mass, which is attached to the first pendulum rod and connected via the freely movable joint to the second pendulum rod such that the first and the second pendulum rods are moved together when force acts on the oscillation mass; and
   a pressure-controlled support device configured to increase or reduce a weight of the oscillation mass by relieving or loading such that frequency changes are selectively achieved, wherein the support device is an integral component of the second pendulum rod.

2. The adaptive pendulum-tuned mass damper according to claim 1, wherein the support device is operated with a gas/air volume which is under a pressure that brings about a change in the weight of the oscillation mass, wherein said gas/air volume is provided in a gas/air container, which is completely an integral component of the support device or is partially mounted separately therefrom.

3. The adaptive pendulum-tuned mass damper according to claim 2, wherein the gas/air volume is selected such that less than 10% of the volume is displaced or shifted by the support device during a pendulum movement of the tuned mass damper.

4. The adaptive pendulum-tuned mass damper according to claim 1, wherein the support device is an air spring element or a pneumatic cylinder.

5. The adaptive pendulum-tuned mass damper according to claim 4, wherein the air spring element is an elastic bellows or an arrangement of several elastic bellows stacked one above the other, a roller bellows, or an arrangement of roller bellows arranged one behind the other.

6. The adaptive pendulum-tuned mass damper according to claim 5, wherein the elastic bellows or the arrangement of elastic bellows has a small cross-section in relation to the gas volume.

7. The adaptive pendulum-tuned mass damper according to claim 1, wherein the length of the at least one first pendulum rod is different from the length of the second pendulum rod.

8. The adaptive pendulum-tuned mass damper according to claim 7, wherein the at least one first pendulum rod is 50-100% shorter or longer than the at least second pendulum rod.

9. The adaptive pendulum-tuned mass damper according to claim 1, wherein the at least first pendulum rod entirely or partially constitutes an upper pendulum, and the at least second pendulum rod entirely or partially constitutes a lower pendulum, and the two pendulum rods are interconnected via a common joint.

10. The adaptive pendulum-tuned mass damper according to claim 1, wherein the at least first pendulum rod entirely or partially constitutes a lower pendulum, and the at least second pendulum rod entirely or partially constitutes an upper pendulum, and the two pendulum rods are interconnected via a common joint.

11. The adaptive pendulum-tuned mass damper according to claim 1, wherein the joint is a Cardan joint.

12. The adaptive pendulum-tuned mass damper according to claim 1, wherein the joint is a ball joint.

13. The adaptive pendulum-tuned mass damper according to claim 1, wherein the support device has a guide rod.

14. The adaptive pendulum-tuned mass damper according to claim 1, further comprising a pressure-regulating unit which compensates for pressure fluctuations, which are caused by changed external conditions during operation, by increasing or lowering the pressure of the gas/air volume via a port when preset limit values are reached.

15. The adaptive pendulum-tuned mass damper according to claim 1, wherein the oscillation mass is attached to the first pendulum rod such that a center of gravity of the oscillation mass is in proximity to the freely movable joint or is identical thereto.

16. The adaptive pendulum-tuned mass damper according to claim 15, wherein the oscillation mass is three-dimensionally designed such that there is a correspondingly-shaped free space, into which the second pendulum rod at least partially extends with its joint, and space for pendulum movements in the operating state is provided.

17. The adaptive pendulum-tuned mass damper according to claim 1 is configured as a two-dimensional transverse damper, wherein the oscillation mass is connected via two or more joints to the same number of first pendulum rods of equal length and via the freely movable joint connected to the second pendulum rod so that the oscillation mass is movable in the horizontal plane.

18. The adaptive pendulum-tuned mass damper according to claim 1, further comprising at least one further damping unit, which is mounted on the joint of the first pendulum rod and/or on a circumference of the oscillation mass.

19. The adaptive pendulum-tuned mass damper according to claim 18, wherein the at least one further damping unit is a rotational damper.

20. The adaptive pendulum-tuned mass damper according to claim 1, wherein the adaptive pendulum-tuned mass damper is mounted on a mobile carrier structure, which is reversibly attached to a structure during erection or deconstruction of the structure.

21. A wind turbine comprising a nacelle, a rotor, and a tower, wherein the wind turbine has an adaptive pendulum-tuned mass damper according to claim 1, which is permanently or temporarily attached outside or inside, in or to the tower or to or in the nacelle.

* * * * *